June 19, 1928.
E. E. LYNCH ET AL
1,674,406
LICENSE TAG HOLDER FOR MOTOR VEHICLES
Filed July 23, 1927
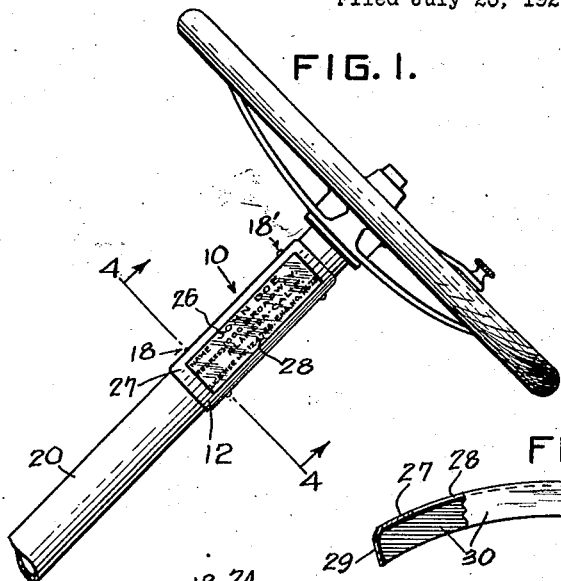
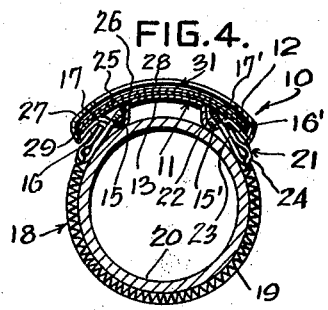
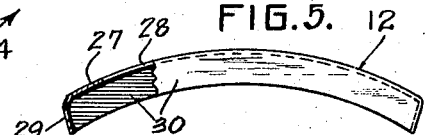
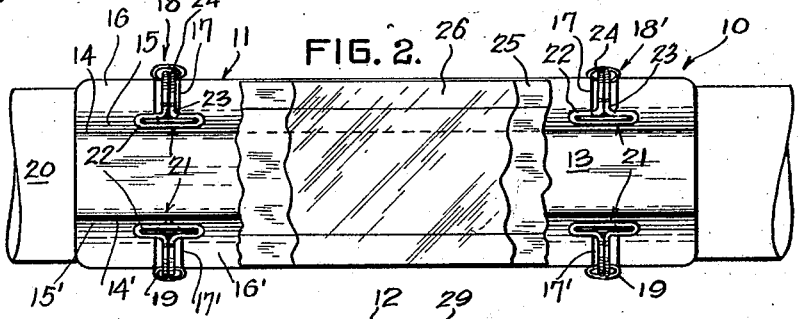
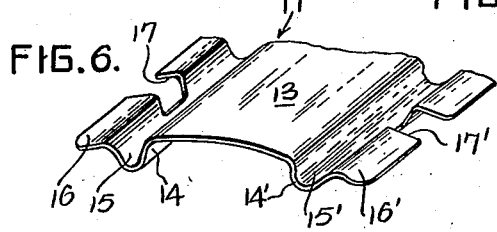
INVENTORS
ERNEST E. LYNCH AND
MALCOLM E. MITCHELL.
BY
ATTORNEY Patented June 19, 1928.

1,674,406

UNITED STATES PATENT OFFICE.

ERNEST E. LYNCH AND MALCOLM E. MITCHELL, OF ALAMEDA, CALIFORNIA; SAID MITCHELL ASSIGNOR TO SAID LYNCH.

LICENSE-TAG HOLDER FOR MOTOR VEHICLES.

Application filed July 23, 1927. Serial No. 207,826.

This invention relates to improvements in license-tag holders for motor vehicles and has for its primary object the provision of a cheaply constructed frame adapted for ready attachment to any portion of the vehicle, preferably the steering post thereof, and just below the steering wheel, where it may be easily seen for the purpose of identifying the owner, or driver, of the vehicle to which it is attached.

The motor vehicle laws of the State of California particularly state that the license tags issued by said department to drivers of motor vehicles, should be placed in a "conspicuous place in the driver's compartment of all motor vehicles", and heretofore it has been the practice to place these tags in small frames preferably secured to the instrument board of the vehicle.

Our invention consists of a small supporting frame so designed and constructed as to fit the steering post column of any motor vehicle, and to which column it may be readily secured by means of resilient column embracing loops, formed preferably of flat coiled steel wire, and so connected to the frame that they may be easily and quickly released therefrom when it is desired to apply the frame to the column or detach it from said column.

The object of our invention is the provision of a simple form of license-tag holder which is provided with a saddle-shaped member adapted to conform to the peripheral surface of any motor vehicle's steering column and which embodies in its construction simple and efficient yielding loop members adapted to conform to and embrace the column to hold the device securely in place in a conspicuous position, preferably immediately beneath the steering wheel.

Other objects and advantages of our invention will be apparent with reference to the following detailed description and the accompanying sheet of drawings in which:

Figure 1 is an elevation of a portion of a motor vehicle steering column showing our license tag holder in place thereon;

Figure 2 is an enlarged plan view of the supporting frame and resilient column embracing loops, the license tag and transparent covering being shown partly broken away, the cover of the device being removed;

Figure 3 is a plan view of the inside of the cover of the device;

Figure 4 is an enlarged transverse sectional view, taken on the line 4—4 of Figure 1, and illustrating the formation of the device, and the method of securing the resilient column embracing loops to the frame thereof;

Figure 5 is an enlarged end view of the cover, with one edge broken away to illustrate the frame engaging lip formed at its lower edge;

Figure 6 is a fragmentary perspective view of one end of the supporting frame, showing its general configuration, also the notches formed in opposite side edges thereof into which the loop ends are secured; and Figure 7 is a perspective view of one of the T-shaped members carried by the loop ends for engagement with the notched sections of the supporting frame.

Referring with greater particularity to the drawing, in which the preferred embodiment of our invention has been shown, 10, in a general way, designates the entire license-tag holder, which specifically consists of a supporting frame 11 and cover 12 provided with a transparent covering. The supporting plate 11 is of elongated form and consists of a centrally and longitudinally disposed rib 13 formed by the up-bent sections 14 and 14', outwardly curved fluted sections 15 and 15' and laterally disposed wing sections 16 and 16', the whole being preferably pressed to form from sheet brass, or other similar light weight material. The rib 13, and wing sections 16 and 16' of this frame are preferably of saddle-like form in curvature to conform to the outer surface of the ordinary steering column, these columns varying in cross-section from the circle to that of the oval, depending upon the particular make of machine, and the fluted sections 15 and 15' thereof, forming supports adapted to permit the rib 13 and wing sections 16 and 16' to adjust themselves to any particular curvature of column surface, as clearly shown in Figures 4 and 6.

The wings 16 and 16' are provided with sets of opposed notches 17 and 17', Figures 2 and 6, formed adjacent the ends of the frame 11, these notches being cut through the wing sections and partially through the flutes 14 and 14' and adapted to form engaging means for the resilient column engaging loops 18 and 18', hereinafter to be described.

The loops 18 and 18' are exactly alike, each consisting, preferably, of a flat coil spring 19 of sufficient length, when looped, to yieldingly and snugly embrace an ordinary steering column 20, said springs 19 having secured to their opposite extremities T-shaped members 21, preferably formed of wire as shown, and each consisting of a flat looped head 22, shank 23 and an eye 24 to which the spring ends are secured.

The heads 22 of said members 21 are adapted to rest in the flutes 15 and 15' of the frame 11 of the device with the shanks 23 thereof, extending through the notches 17 and 17', as clearly shown in Figure 2.

As shown in Figure 4, the tendency of the loops 19, when arranged about the column, is to draw the frame 11 tightly against the column, with no possibility of its being accidently disengaged therefrom, although the frame may be readily moved or adjusted longitudinally relative to said column, if desired.

In securing the device to the steering post column, the frame 11 is first positioned and held in place with one hand and the heads 22 at one end of the loops 18 are then inserted in the notches 17 and the loops stretched around the column until the heads 22 at the opposite extremities of these loops until in a position to be readily slipped into the opposite notches 17' formed in the frame.

The license tag 25 is placed in the cover 12 and a strip of transparent material 26 placed between the cover top 27 and the tag 25, as shown in Figures 2 and 4, the cover being provided with a rectangular sight opening 28 formed in its top 27, through which the license tag data may be readily seen.

The cover 12 is of arcuate form, as shown in Figures 4 and 5, and fitted to conform to the saddle-like formation of the frame 11, and is provided with downwardly and inwardly flanged sides 29 and end sections 30 terminating in resilient lips, and adapted, when placed over the edges of the wings 16 and 16' and pressed thereagainst, to snap over these edges and form with the frame 11 a license-tag housing 31, as clearly shown in Figure 4.

The frictional engagement of the cover flanges 29 and 30 of the cover, with the wing edges of the frame, is sufficient to hold the cover securely in place on said frame, although, when desired, the cover may be readily disengaged therefrom by pressing upwardly against said flanges with the fingers of the hand.

It will be apparent from the foregoing description that we have produced a license-tag holder which is of extremely simple form, is cheap in construction and the parts of which may be quickly and easily assembled for use, and one that may be readily applied to any of the various forms and sizes of steering columns, free from adjustment requirements, and that once placed is dependably placed, due to the resilient grip of its column-embracing loops.

Having thus described our invention, we claim, and desire to secure by Letters Patent:

1. A device of the class described comprising an elongated transversely curved supporting frame adapted to conform to the peripheral surface of a motor vehicle's steering column, said frame consisting of a central rib and laterally projecting wing sections, notches formed in said wing sections, yielding loop members detachably carried by said notches and adapted to embrace the steering column, and cover means frictionally carried by said frame and forming therewith a license-tag housing.

2. A device of the class described comprising an elongated transversely curved license-tag supporting frame consisting of a centrally disposed rib having integrally formed and laterally disposed flutes carrying wing sections, notches formed in said wing sections, and resilient attaching loops therefor having means formed at their extremities for detachably engaging said notches.

3. A license-tag holder comprising, an elongated transversely curved supporting frame having a centrally disposed rib, laterally disposed fluted sections forming spacing members and integrally formed wing sections, said wing sections having notches formed in opposite edges thereof, resilient loops for said frame consisting of coiled spring sections forming retaining members, and T-shaped engaging members carried by said loops and adapted for engagement in the notches of said wing sections.

4. A device of the class described comprising, an elongated transversely curved supporting frame adapted to conform to the peripheral surface of a motor vehicle's steering column, said frame consisting of a central rib and laterally projecting wing sections, notches formed in said wing sections, yielding loop members detachably carried by said notches and adapted to embrace the steering column, and a cover means, provided with a transparent closure, frictionally carried by said frame and forming therewith a license-tag housing.

In testimony whereof, we hereby affix our signatures, this 18th day of July, 1927.

ERNEST E. LYNCH.
MALCOLM E. MITCHELL.